July 13, 1926.
C. B. BAILEY
GASKET
Filed June 29, 1925
1,592,291
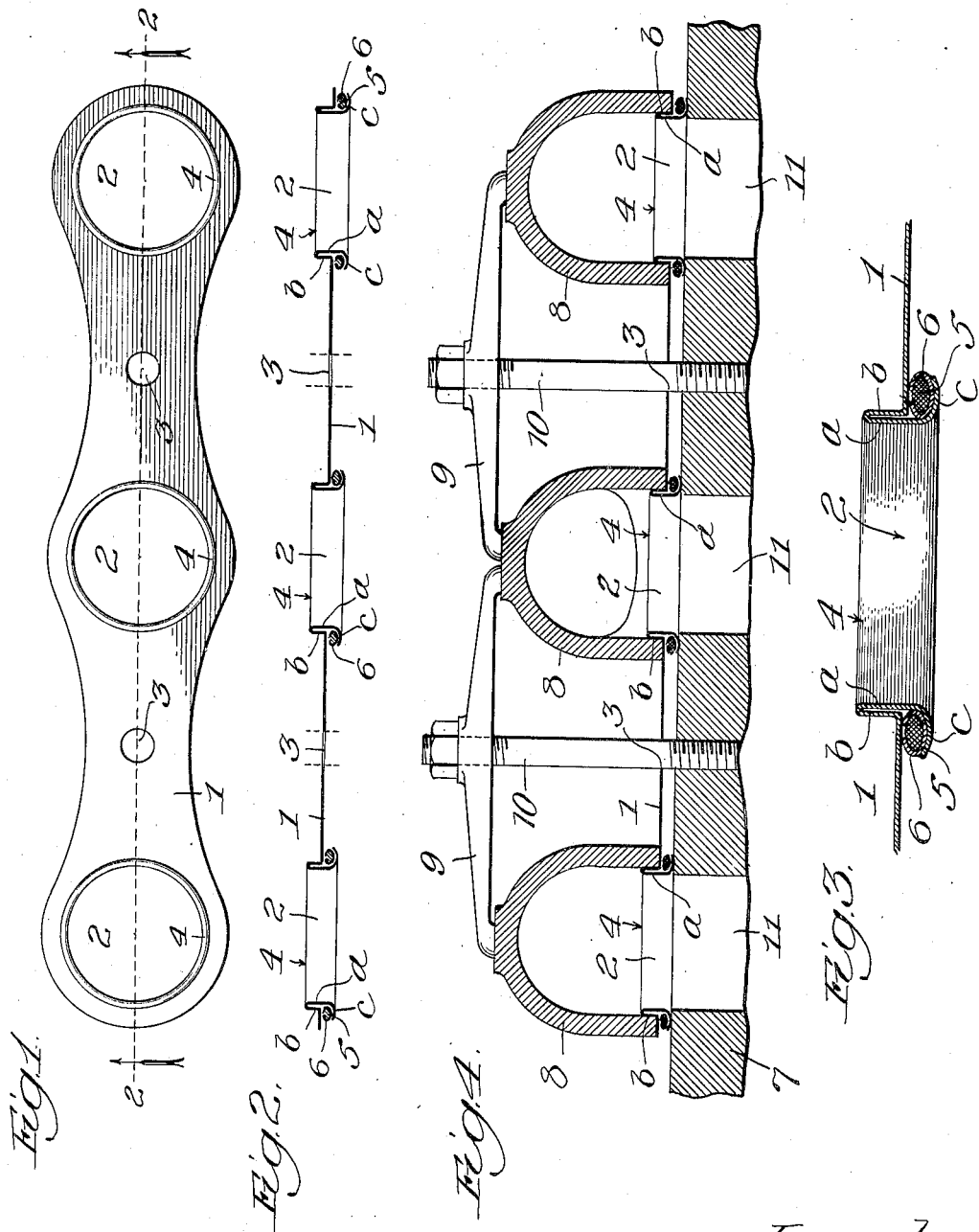
Inventor:
Claude B. Bailey,
By Eugene Swann
Atty Patented July 13, 1926.

1,592,291

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 29, 1925. Serial No. 40,176.

This invention has particular reference to manifold gaskets such as are in elongated strip form and have a plurality of port holes spaced apart lengthwise of the gasket body so that single gaskets of the kind may accommodate a plurality of spaced openings in a cylinder block and associated manifold pipes as in automobile engine assemblies.

The object of my present invention is to provide asbestos rings encased in sheet metal and hold said encased rings about the port holes of the gaskets by flanges on the tubular guides which project outward from the gaskets on the sides opposite the rings. These rings provide the cushions required without the use of asbestos layers extending over the entire area of the gaskets or being coextensive therewith, and thereby simplify the structure and lessen its cost of manufacture.

The invention consists further in the matters hereinafter described and claimed.

In the accompanying drawings:—

Fig. 1 is a plan view of a manifold gasket constructed in accordance with my invention;

Fig. 2 is a longitudinal sectional view on line 2—2 of Fig. 1;

Fig. 3 is an enlarged vertical sectional view through the gasket at one of its port holes to more clearly show the construction; and Fig. 4 is a sectional view showing the gasket clamped in place between the cylinder block and its associated manifold pipes.

The manifold gasket of my invention has a relatively narrow and elongated body portion 1 made from a single layer or piece of sheet metal, such as copper, brass, aluminum, zinc or the like. A plurality of port holes 2, 2 are provided in the body 1, and these holes, of the same size, are spaced apart lengthwise of the gasket body with smaller holes 3, 3 between them, as shown.

The gasket is provided with a plurality of combined pressure receiving portions and tubular guides carried by the gasket body 1 at each of the port holes 2, 2 and completely surrounding the same. The guide portions 4, 4 are integral with the sheet metal body 1 and project outward from one side thereof. To provide these guides, the metal at the edges of the port holes 2 is flanged up from the plane of the body 1, the turned up metal being doubled or folded over to provide each guide with inner and outer flanges $a$, $b$, as clearly shown in Fig. 3.

These flanges $a$, $b$ are integrally joined about their upper edges by the fold in the metal between them. The flange $a$ is inside and extends through the adjacent opening 2 and continues beyond the opposite side of the body 1 where it is bent outward to provide a flange $c$ facing the body 1 on the side thereof opposite the flange $b$.

An annular member composed of a ring of asbestos or other packing material 5 encased in a sheet metal shell 6 is inserted in the space between the body 1 and flange $c$. This annular member 5—6 is supported by the flange $c$, and the latter is slightly curved or dished to more readily fit the member and hold it against the body 1, as shown in Fig. 3.

The members 5—6 provide the cushion required for the gasket when clamped between a cylinder block 7 and its associated manifold pipes 8, 8 by the usual clamps 9, 9 on studs 10, 10. The studs extend through the holes 3, 3 and support the gasket on the block 7 with the guides 4, 4 extending outward to enter the openings in the manifold pipes 8, 8 and guide them into register with their respective cylinder ports 11, 11, as shown in Fig. 4.

With the members 5—6 about the port holes 2, 2, the gasket has asbestos or other packing as a part of its cushions without the use of layers of that material over the entire surface of the metal layer 1 of the gasket body. This simplifies the construction and lessens manufacturing cost thereof, as well as providing a durable gasket. Moreover, the asbestos rings 5 are covered or encased in sheet metal 6 to protect them.

The details of structure shown and described may be variously modified without departing from the spirit and scope of my invention.

I claim as my invention:

1. A manifold gasket, having an elongated body made entirely of sheet metal and having a plurality of port holes therein spaced apart lengthwise of the gasket body, a plurality of tubular guides carried by the body at the respective port holes and extending outward therefrom, and asbestos rings encased in sheet metal on the side of the body opposite the guides and held about the port holes by said guides.

2. A manifold gasket, having an elongated body made entirely of sheet metal and having a plurality of port holes therein spaced apart lengthwise of the gasket body, asbestos rings encased in sheet metal on one side of the body, and tubular guides about the respective port holes and projecting outward therefrom on the side of the body opposite said rings, said guides being folded from sheet metal to have inner and outer flanges with the inner flanges extending through the associated port holes and engaging the casings of the rings for holding the same at the port holes.

3. A manifold gasket, having an elongated body of a single layer of sheet metal and having a plurality of port holes therein spaced apart lengthwise of the gasket body, asbestos rings encased in sheet metal on one side of the body, and tubular guides about the respective port holes and projecting outward therefrom on the side of the body opposite said rings, said guides being bent into folded form from the metal of the body at the respective port holes and having flanges engaging the encased rings for holding the same at the port holes.

In testimony whereof I affix my signature this 24 day of June, 1925.

CLAUDE B. BAILEY.